United States Patent [19]
Adorjan

[11] Patent Number: 4,718,459
[45] Date of Patent: Jan. 12, 1988

[54] UNDERWATER CRYOGENIC PIPELINE SYSTEM

[75] Inventor: Alexander S. Adorjan, Pearland, Tex.

[73] Assignee: Exxon Production Research Company, Houston, Tex.

[21] Appl. No.: 829,054

[22] Filed: Feb. 13, 1986

[51] Int. Cl.⁴ ............................. F16L 1/00; F16L 1/04
[52] U.S. Cl. ..................................... 138/105; 138/106; 138/107; 138/149; 405/154; 405/172; 285/47
[58] Field of Search ............... 138/105, 106, 103, 107, 138/108, 149, 178; 405/172, 154; 285/41, 47, 45

[56] References Cited

U.S. PATENT DOCUMENTS

| | | | |
|---|---|---|---|
| 3,168,114 | 2/1965 | Martin | 138/105 |
| 3,309,879 | 3/1967 | Miller | |
| 3,375,856 | 4/1968 | Howard et al. | 138/106 |
| 3,379,027 | 4/1968 | Mowell et al. | |
| 3,388,724 | 6/1968 | Mowell et al. | |
| 3,530,680 | 9/1970 | Gardner | |
| 3,865,145 | 2/1975 | McKay et al. | |
| 3,885,595 | 5/1975 | Gibson et al. | |
| 3,933,182 | 1/1976 | Costes | 138/149 |
| 3,948,313 | 4/1976 | Best | 138/105 X |
| 3,950,958 | 4/1976 | Loofbourow | |
| 4,133,181 | 1/1979 | Kotcharian | |
| 4,338,045 | 7/1982 | Gour | |
| 4,417,603 | 11/1983 | Argy | |
| 4,618,114 | 10/1986 | McFarland | |

FOREIGN PATENT DOCUMENTS

| | | |
|---|---|---|
| 7128574 | 3/1973 | France |
| 1060953 | 3/1967 | United Kingdom |
| 1462123 | 1/1977 | United Kingdom |
| 1539281 | 1/1979 | United Kingdom |
| 2032572 | 5/1980 | United Kingdom |
| 2070186 | 9/1981 | United Kingdom |
| 2070187 | 9/1981 | United Kingdom |
| 2135011 | 8/1984 | United Kingdom |
| 2151326 | 7/1985 | United Kingdom |

OTHER PUBLICATIONS

Backhaus, "Subsea Pipelines for Low-Temperature Liquids to be Used for Gas Tanker Loading/Unloading in Foreshore Areas," Gastech-82 LNG/LPG Conference, 1982 Proceedings, pp. 197–201.

Backhaus and Wieske, "Subsea LNG Pipelines," Meerestechnik, vol. 8, No. 6, pp. 208–212, Dec. 1977.

Crowl, "An LNG Ship Loading Pipeline," Applications of Cryogenic Technology, vol. 4, pp. 127–144.

Frieseman, "Brunei LNG Plant and Loading Facilities," Session 4, Paper 3, LNG-2, The Second International Conference and Exhibition, 1970, Paris, France.

Corkill, "Cove Point LNG Receiving Terminal Nears Completion," Pipeline Industry, Sep. 19, 1977, pp. 39–42.

Crawford and Bergman, "Columbia-Consolidated LNG Receiving Terminal Cove Point, Maryland," Fourth International Conference On LNG, Session II, Paper 4, 1974.

Veerling, "A Submarine Offshore Unloading Line for LNG," Third International Conference on LNG, Session II, Paper 8, 1972.

Van Dyke et al., "Under Water/Buried LNG Pipelines," Gas Abstracts, vol. 33, No. 10, pp. T154–T164, Oct. 1977.

Dumay, J. M., "Cryogenic Flexible Pipes for Offshore LNG-LPG Production," Gastech-81 LNG/LPG Conference, 1981.

Laurent, J., "Wide Diameter Flexible Pipe with High Performance and Long Lengths for Great Depths," New Technologies for Exploration and Exploitation of Oil and Gas Resources, Symposium, vol. 1, pp. 383–392, Luxembourg, 1979.

*Primary Examiner*—James E. Bryant, III
*Attorney, Agent, or Firm*—Herbert O'Niell

[57] ABSTRACT

An underwater cryogenic pipeline system comprising an insulated underwater pipeline in an integral open frame is disclosed. The pipeline is anchored to the frame at a plurality of spaced apart locations. Bellows-type expansion joints between the pipe anchors compensate for contraction in the pipeline. The frame, which is anchored to the soil at at least one location, resists axial forces in the system and wave and current loadings. The system is preferably fabricated in modules and assembled on site.

32 Claims, 10 Drawing Figures

| PRESSURE PSI | PRESSURE PASCALS | WATER DEPTH FEET (METERS) | GAS COMPOSITION |  |  |  |  |
|---|---|---|---|---|---|---|---|
|  |  |  | N₂ + He | N₂ | N₂ + Ar | Ar | Ar + Kr |
| 43.3 | .298 | 100 (30.5) |  |  |  |  | ARGON + KRYPTON 0% Kr 157' |
| 86.6 | .597 | 200 (61) |  | NITROGEN | ARGON | ARGON |  |
| 129.9 | .896 | 300 (91.5) |  | NITROGEN | 100% Ar | 415' 126.5 (METERS) |  |
| 173.2 | 1.194 | 400 (122) | 0% He | NITROGEN + ARGON 0% Ar |  |  |  |
| 216.5 | 1.493 | 500 (152.4) | HELIUM + NITROGEN |  |  |  |  |
| 259.8 | 1.792 | 600 (182.9) |  |  |  |  |  |
|  |  | VERY LARGE DEPTH | 15% He |  |  |  |  |

UNDERWATER CRYOGENIC PIPELINE SYSTEM

BACKGROUND OF THE INVENTION

1. Field of the Invention

This invention relates to underwater cryogenic pipeline systems. In particular, the invention relates to underwater liquefied natural gas pipeline systems for use in ice infested waters to transfer liquefied natural gas between an onshore production or storage facility and an offshore vessel.

2. Description of Related Art

Liquefied natural gas (LNG) is a cryogenic liquid. At atmospheric pressure its temperature is about −162° C. (−260° F.). The principal design considerations for LNG pipelines are discussed below. First, the pipeline material must have sufficient ductility and toughness to be usable at cryogenic temperatures. Only aluminum, high nickel content steels and austenitic stainless steels are suitable.

The second principal design consideration is contraction of the pipeline. An LNG pipeline constructed at ambient temperatures and filled with LNG will contract. For example, a pipeline made of 304 stainless steel will contract about 13 feet per mile when cooled from 21° C. (70° F.) to −162° C. (−260° F.). If the pipeline is restrained at both ends and cooled as above, the stress resulting from contraction will exceed the allowable stress in the pipeline material. The same is true for aluminum and high nickel (9%) steels. It is therefore necessary to have some type of expansion joint for compensating for expansion and contraction. Pipe loops, shown in U.S. Pat. No. 3,379,027 are one well know type of expansion joint. Others are discussed below.

U.S. Pat. Nos. 3,388,724 to R. W. Mowell, et al. and 3,885,595 to Gibson, et al illustrate bellows type expansion joints. Contraction is taken up by a longitudinal bellows or corrugation in the inner pipe. The bellows is constructed out of a material that is relatively thinner than the material of the LNG pipeline so the bellows is free to expand and contract axially with respect to the LNG pipeline. A variation on the bellows expansion joint is snake pipe, such as that manufactured by Tokyo Rasenkan Seisakusko, Ltd. Snake pipe consists of a bellows formed out of relatively thick gauge material. The thicker material should yield increased reliability over thin-walled bellows. However, the thick bellows acts as a powerful spring and will induce higher axial loadings than bellows when the snake pipe is compressed axially during construction of the system.

One material, 36 percent nickel steel, also known as INVAR, is a candidate for use in LNG pipelines due to its low coefficient of thermal expansion. Because INVAR has such a low coefficient of thermal expansion, an INVAR pipe can be restrained at both ends and used for LNG service without exceeding allowable stress limits for the INVAR, thus the use of bellows or expansion loops can be avoided. However, experience with large diameter INVAR pipe is limited and present design codes do not include INVAR as cryogenic pipeline construction material.

The third principal design consideration associated with LNG pipelines is heat transfer. LNG pipelines must be well insulated to reduce heat leak and excessive LNG vaporization.

The fourth design consideration is anchoring. Whenever there is a change in the direction of the pipeline, for example when a horizontal pipe is attached to a riser, the reaction forces resulting from the hydraulic forces must be taken by anchors. Furthermore, the weight of the pipe together with the product needs to be anchored independently from the casing pipe and insulation. Anchoring is usually accomplished by attaching heavy steel or concrete anchors buried in the ground to the pipeline at regular intervals.

The above problems have been overcome with at least some success in aboveground LNG pipelines. An example is the Brunei LNG project pipeline, described in "Brunei LNG Plant and Loading Facilities", F. Frieseman, Session 4, Paper 3, LNG-2 *The Second International Conference and Exhibition,* 1970, Paris, France; and in "An LNG Ship Loading Pipeline", R. E. Crowl, *Applications of Cryogenic Technology,* Volume 4, pages 127–144. The Brunei pipeline consists of two 304 stainless steel 18" LNG lines extending about 2½ miles offshore to a tanker loading facility. The pipelines are supported above the water by a trestle structure. Bellows type expansion joints are located every 36.5 meters (120 ft.) on the pipeline and the pipeline is attached to the trestle adjacent the expansion joints.

To ship liquefied natural gas (LNG) by sea, a way to transfer LNG between shore-based storage tanks and sea-going tankers is required. Where deepwater nearshore port facilities are available, it may be feasible to construct an aboveground pipeline from the LNG production or storage facility to the dock side. In some cases, such as in Brunei, an above-water jetty out to the offshore LNG transfer facilities can be built. A conventional LNG pipeline is then laid on the jetty. Obviously, this approach will not be feasible where LNG loading facilities must be located far offshore in deep water or in areas, such as the Arctic, where ice movement can impose large forces on above water structures. Building a jetty strong enough to withstand ice forces would probably make this approach too costly. Thus, an underwater LNG pipeline will be preferred when offshore loading facilities are far offshore in deep water or ice infested areas, such as the Arctic.

Three principal systems for underwater transport of LNG are known. They are the tunnel system, the roller supported retrievable line and the INVAR pipeline. Several published articles have described the underwater LNG pipeline tunnel constructed at Cove Point, Md. during the late 1970's. The Cove Point tunnel consists of a large, approximately one mile long, concrete tunnel laid on the sea bed. The tunnel contains two passageways for LNG lines and a smaller maintenance passageway. The Cove Point tunnel contains four lines in two pairs. Each pair is contained in a separate passageway in the tunnel. The maintenance passageway is sealed-off from the LNG passageways by pressure tight doors. Water infiltration into the insulation on the lines is not a problem because the LNG lines are always dry. LNG leaks are readily detected and repairs through the access passageway are relatively easy. The primary disadvantage of a tunnel system is that it is extremely expensive to construct.

The second prior art system is the retrievable line. U.S. Pat. No. 3,379,027 describes this system in detail. An inner LNG line is supported on rollers in a large casing so the LNG line can be disconnected and rolled out of the casing. The retrievable line could be simpler and less expensive than the tunnel. Repairs would be made to the lines by retrieving them. However, there is no history behind this system which has never been constructed.

U.S. Pat. No. 4,133,181 to Kotcharian proposes a two-section cryogenic pipeline from the shore to offshore loading facilities. The first pipeline section is supported on pillars above the water level. The pipelines are connected together with cross braces to form a stiff frame that can span between the pillars above the water. The second segment of the system is connected to the first segment and consists of prefabricated underwater pipeline segments and a number of spaced-apart pillars extending above the surface of the water. The underwater pipeline segments are routed up and over the pillars so the connections between the segments can be made above the surface of the water. There are several disadvantages with Kotcharian's system, as follows. Kotcharian states that expansion joints are utilized every 200 meters. Expansion joints would be needed every approximately 36 meters, based on the capability of expansion joints currently available. There is no apparent advantage to submerging the pipeline, since the system needs above water pillars to connect and anchor the underwater segments. Kotcharian's system will probably not work in deep water where fabricating the necessary pillars would make the system too costly. In addition, the pillars and the pipelines are susceptible to damage by moving ice in the Arctic.

SUMMARY OF THE INVENTION

The invention is a novel solution to the problems in the prior art with underwater LNG pipelines. The invention is an insulated LNG pipeline and an integral open space frame. The pipeline preferably utilizes conventional metal bellows expansion joints at regular intervals to compensate for contraction. A steel watertight jacket over the insulation and the expansion joints prevents water from infiltrating the insulation. The expansion joints are preferably in closely adjacent pairs spaced about 73 meters (240 feet) apart. The pipeline is anchored to the frame between the expansion joints so the axial forces in the pipeline resulting from contraction and from transient hydraulic forces, similar to water hammer, are resisted by the frame. This greatly simplifies the installation procedure because no or only simple anchors are required for the frame to ground anchoring. Anchoring is usually very expensive, especially for Arctic submarine applications. The frame also eliminates the weakness of the pipeline system at the expansion joints and withstands the pipeline loading due to hydraulic forces, pipe contraction and sea bed anchor forces. It may be laid on or under the sea bed using conventional techniques.

One principal advantage of the invention is that the system may be prefabricated in modular sections that can be transported to the site of the pipeline. The modular sections can then be connected on-site and laid on or under the sea bed using conventional methods. Heavy anchoring is therefore not needed to transmit pipeline forces to the ground, since most of the forces will be taken by the truss system. When the system is installed under the sea bed, i.e. buried, further advantages are as follows. The chance of damage to the system by ice "gouging" is reduced. Ice gouging is gouging of the sea bed by the submerged portions of the large ice features. In addition, when the system is buried, friction from the surrounding soil acts as additional anchoring, which is called "virtual anchoring."

Another principal advantage of the invention is it permits use of a conventional metal bellows expansion joint design underwater without undue expense or reliability problems.

In a second embodiment of the invention, the pipeline is constructed of 36 percent nickel steel, or INVAR steel, and thus no expansion joints are required. All other features of construction of this embodiment are the same as the first embodiment.

BRIEF DESCRIPTION OF THE DRAWINGS

The several embodiments of the invention are shown in the drawings, in which like reference numbers indicate like parts. A description of each drawing follows.

DETAILED DESCRIPTION OF THE INVENTION

The following description refers to loading a LNG tanker from an onshore storage tank. The invention applies equally to unloading LNG tankers, as well as all similar applications.

Figure 1:
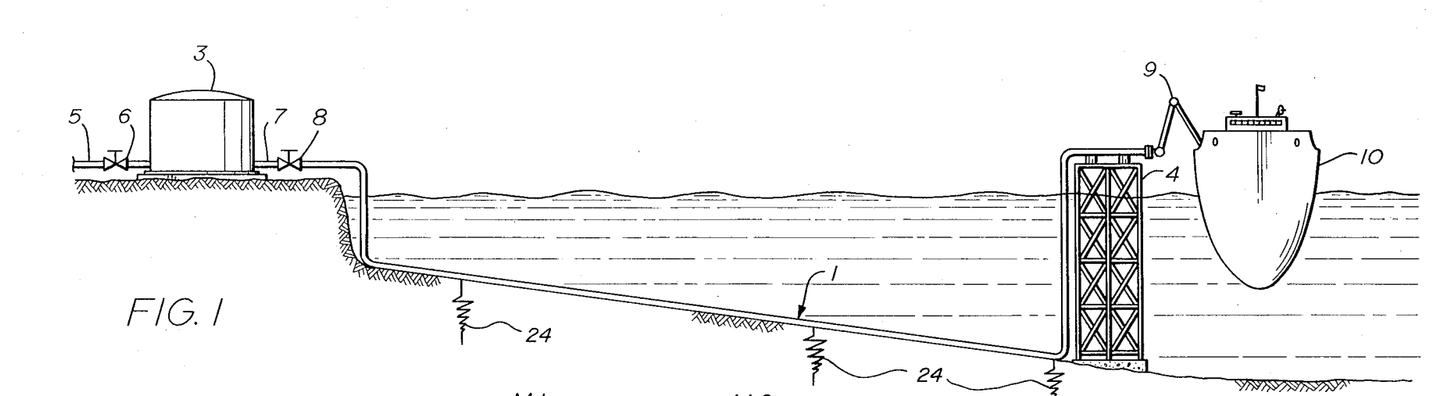
FIG. 1 is a plan view of an embodiment of the invention for transporting LNG from a shore-based storage facility to an offshore loading facility.

FIG. 1 illustrates the environment of the invention. An underwater LNG pipeline system 1 is laid on the sea bed extending from a conventional shore-based LNG storage tank 3 to an offshore loading facility 4. LNG from production facilities (not shown) is supplied to the storage tank 3 through a supply pipeline 5. A fill valve system 6 in the supply pipeline 5 controls filling of the LNG storage tank. LNG is removed from the storage tank through an outlet manifold 7. The outlet manifold includes an outlet valve system 8 to control flow through the pipeline system. The offshore end of the LNG pipeline system 1 is connected to conventional LNG loading arms 9 designed to mate with the LNG intake manifold system of an LNG tanker 10 to fill the LNG tanker. A loading valve system may be included to control flow of the LNG during loading operations.

Figures 2, 3:
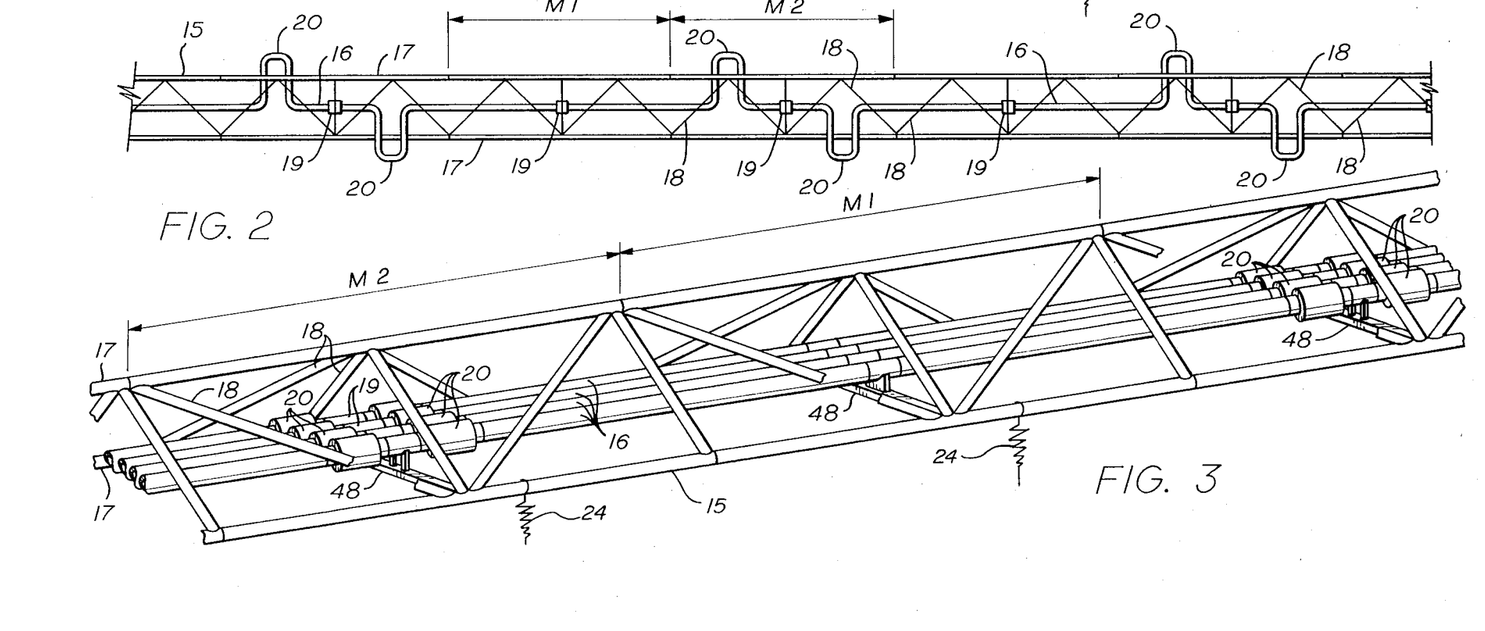
FIG. 2 is a plan view of a section of a first embodiment of the invention.
FIG. 3 is a perspective view of a triangular frame version of the embodiment shown in FIG. 2.

FIG. 2 shows the basic concept of the invention schematically. An elongate frame 15 is provided to carry the LNG pipeline 16. The frame must be strong enough to carry the pipeline and withstand axial loads from the pipeline and wave and sea bed forces. It is fabricated from elongate beams 17 and bores 18 that are connected to the beams 17 to form the frame.

The pipeline 16 is attached to the frame at regular intervals by pipe anchors 19. Expansion joints 20 are located on the pipeline between successive pipe anchors 19. The expansion joints 20 in FIG. 2 are pipe loops. However, any other type of expansion joint can be substituted for the pipe loops, or 36% nickel (INVAR) steel can be used in which case no expansion joints are needed.

The expansion joints 20 are preferably preloaded before the pipeline is cooled to LNG operating temperature. The pipe loops 20 are preloaded by axially compressing the pipeline a preselected amount between successive pipe anchors 19 during construction of the system. This causes the pipe loop 20 to close, resulting in a bending stress in the pipe loop 20. When the pipeline is cooled to LNG operating temperature, the pipeline between successive pipe anchors contracts, opening the loop and reducing the bending stress. The amount of preload is selected to minimize or eliminate bending stresses in the expansion joint under operating conditions at cyrogenic temperatures. Before the pipeline is cooled to LNG operating temperatures, the axial compressive loadings due to the preload are resisted by the pipe anchors 19 and the frame 15.

FIG. 3 illustrates the preferred embodiment of the invention. Three longitudinal frame members 17 are connected together by braces 18 to define an open triangular space frame 15 with a central longitudinal opening. Four cryogenic pipelines 16 are supported in the central longitudinal opening of the frame.

A LNG pipeline system usually includes at least one vapor return pipeline. The LNG liquids loaded into the tanker 10 displace LNG vapor in the tanker. The vapor return pipeline carries the vapor back to the storage tank 3 on shore to replace the LNG transferred to the tanker. The number of LNG liquid lines and vapor return lines in a system is chosen based on system capacity and other factors. For example, spare LNG liquid lines can be provided to prevent interruption of loading operations if it is necessary to take a line out of service. Vapor return pipelines can be smaller in diameter than a liquid line since the mass flow rate of vapor is less than that of the liquid. Also, the design requirements for a vapor return line are less regorous than for a liquid line because the temperature of the vapor $-120°$ C. ($-184°$ F.) is less than LNG liquid temperature $-162°$ C. ($-260°$ F.). However, the system designer may decide to make all of the pipelines in the system identical so any line can be used for either liquid or vapor transfer.

In the preferred embodiment, the vapor return lines are identical to the LNG liquid lines. In the following description, only the LNG liquid pipelines 16 will be discussed, although the description below applies equally to vapor return pipelines.

Each pipeline preferably has pairs of expansion joints at regular intervals. Main pipe anchors are provided between the two expansion joints in each pair to anchor the inner pipe to the frame. Intermediate anchors are located between successive main anchors so there is at least one expansion joint between successive main and intermediate anchors. The pipe anchors are connected to lateral crossmembers attached to the frame inside the longitudinal opening. If desired, all the anchors could be main anchors, although this is not necessary.

The length of the pipeline between successive anchors is a design choice dictated by the capabilities of the expansion joints 20 selected for use in the system. In a system utilizing a 26 inch (660 mm) nominal inside diameter pipeline, and compatible metal bellows expansion joints that are commercially available, the length between successive anchors 19 would preferably be about 36.6 meters (120 feet). The mean value of the coefficient of linear thermal expansion between 20° C. (ambient conditions) and $-162°$ C. for 304L stainless steel is $15 \times 10^{-6}°$ C. Based on an absolute temperature change of 182° C. and a length between anchors of 36.6 meters, the calculated axial contraction of the pipeline from ambient temperature to LNG service will be 99.9 mm (3.93 inch). This amount of contraction can be compensated for by metal bellows-type compensators that are presently commercially available.

In addition to linear contraction, it is expected some bowing of the pipe will occur as the cryogenic pipelines are brought into service. This is because during startup, as LNG begins to flow through the pipeline, it will not completely fill it. Therefore, the bottom of the pipeline will be at about the temperature of the LNG. The top of the pipe will be at a higher temperature, about the temperature of the superheated LNG vapor. Economic considerations dictate that during startup a temperature difference of approximately 60° C. (108° F.) is allowed between the top and bottom of the pipe. As a result, the bottom of the pipe will contract more than the top, causing bowing. The bowing of the pipe may result in angular rotation of the pipe axis at the anchor locations of about $\pm 0.26°$. About a 1 mm lateral deflection of the pipe in the bellows compensator can be expected as the result of the bowing. Both of these conditions can be tolerated by presently commercially available bellows compensator units. However, bowing of the pipe during installation of the underwater cryogenic pipeline system should also be taken into consideration when the frame is designed to ensure that the limits of the bellows compensators are not exceeded. If required as a result of the amount of bowing expected, it may be necessary to restrain the ends of the pipe with some type of guide adjacent the expansion joints so that bowing does not exceed the amount the joint can withstand.

The underwater cryogenic pipeline system may be laid on the sea bed as shown in FIGS. 1 and 3, or it may be buried in the sea bed, utilizing conventional underwater pipeline construction methods including convention pipeline weighting techniques. If laid on the sea bed, ground anchors 24 may be needed to anchor the frame to the sea bed to resist wave and current forces. The anchoring requirement is minimal, however, because most of the forces are taken by the truss system. The ground anchors may be any of the known types, such as screw-type anchors or pilings. The advantage of laying the pipeline on the sea bed is easy accessibility for inspection and repair, if necessary. The disadvantage is the pipeline system is more susceptible to damage from ships, such as during anchoring, and in the Arctic to damage by moving ice.

If the pipeline is buried in the sea bed, the frame functions as a ground anchor. Thus, special anchors are not needed. However, possible freezing and frost heaving of the soil around the system should be investigated. If necessary, heat tracing may be utilized to prevent damage resulting from freezing.

The design of the preferred embodiment pipeline system is shown in more detail in FIGS. 4, 5, 6, 7 and 8. Each pipeline 16 comprises an inner pipe 26, an outer jacket 27 and insulation 28 in the annular space between the inner pipe and the outer jacket. The insulation can be formed in place or preformed and attached around the inner pipe. However, in either case, there should be some small gap between the outside of the inner pipe and the inside of the insulation so there can be relative movement to prevent cracking of the insulation as a result of contraction or expansion of the inner pipe. The inner pipe 26 is preferably 304L stainless steel for cryogenic service. Alternatively, high nickel steel could be used, subject to the considerations relating to its use discussed above.

The outer jacket 27 completely encloses the inner pipe to prevent water infiltration into the insulation space. The outer jacket is preferably metal, however, it could be any other suitable strong material that will provide a good water barrier. To prevent deflection of the inner pipe and rubbing of the insulation, sliding supports 29 are attached to the bottom part of the insulation 28 at regular intervals, for example every 3.66 m (12 feet) between anchors. The sliding supports consist of a semicylindrical girdle 30 attached to the bottom of the insulation by a number of straps 31. On the lower part of the girdle 30, a sliding block 32 made of high density plastic or similar material is attached by bolts or rivets 33. The sliding block slides on the inner diameter of the jacket as the inner pipe contracts and expands.

Figure 6:
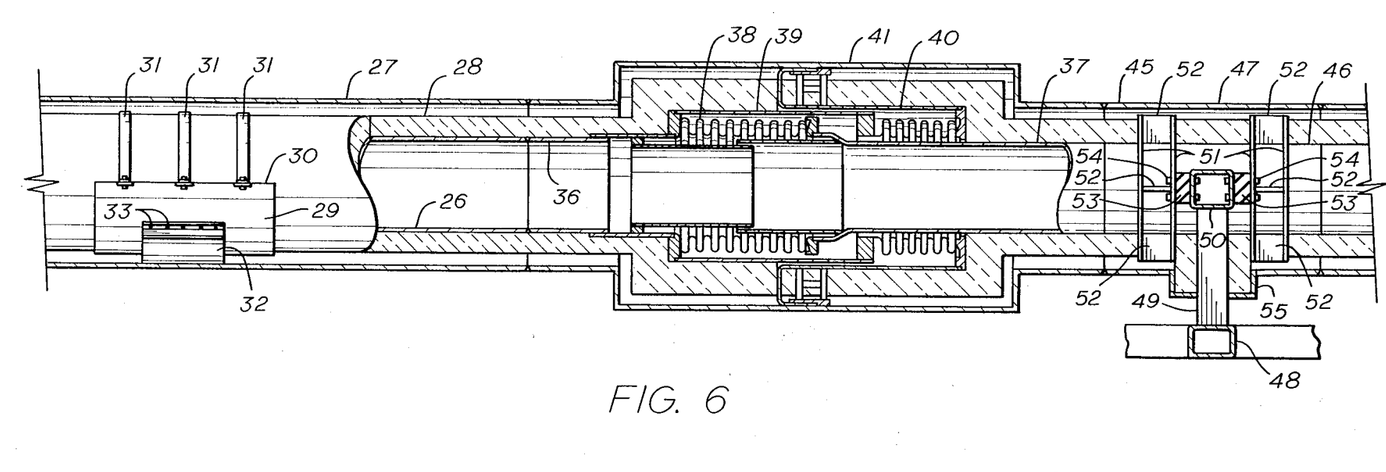
FIG. 6 is a longitudinal cross sectional side view of an expansion joint and main anchor of the embodiment of the invention shown in FIG. 3.

The expansion joints 20 are conventional. Each consists of two pipe ends 36, 37 adapted to be attached to the inner pipe, such as by welding. The pipe ends are connected by a metal main bellows 38 that allows relative axial movement of the pipe ends. An inner housing 39 surrounds the bellows. A second metal bellows 40 connected to an end of the inner housing 39 and the outside of one pipe end 37 provides a secondary seal in case of leakage from the main bellows. The expansion joint is enclosed in an outer housing 41 that connects to the outer jacket 27 of the pipeline. Insulation 28 also fills the annular space between the inner housing 39 and the outer housing 41.

Figure 4:
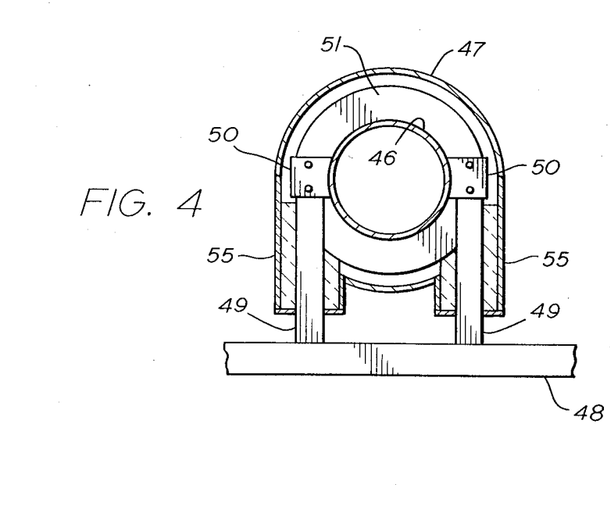
FIG. 4 is a partial cross sectional view of a main anchor of the embodiment of FIG. 3.

A main pipe anchor 45 is located between the expansion joints. The main anchor comprises an inner spool 46 adapted to be connected to the pipe ends of the expansion joints. A housing 47 encloses the inner spool and is connected to the outer housing 41 of the expansion joint. The annular space between the housing 47 and the inner spool 46 is also filled with insulation 28. The inner spools are anchored to the frame 17 at a plurality of lateral crossmembers 48. Support beams 49 are attached to the crossmembers and extend upwardly through the outer jacket to attach to trunnions 50 welded to the inner spool. Two pairs of thrust rings 51 are welded to the inner spool to strengthen the anchor. Each pair of rings is preferably connected by gussets 52 to increase the strength of the connectors. Insulating blocks 53 are bolted between the trunnions and the support rings by bolts and nuts 54 to reduce heat loss. The blocks are preferably made of a material strong in compression and having a low coefficient of thermal conductivity, such as a resin-impregnated wood like "PERMALI" a product manufactured by Permali, Inc., Mt. Pleasant, Pa. If necessary to minimize heat loss through the support beams 49, the trunnions may be deleted from the anchor and the support beams extended upwardly between the thrust rings. The insulating blocks would then be bolted between the support beams and the thrust rings 51. Insulation surrounds the support beams 49 where they penetrate the outer jacket. Caps 55 surround the support beams and enclose the openings through which the support beams enter the outer jacket 47 to prevent entry of water into the outer jacket.

Figure 5:
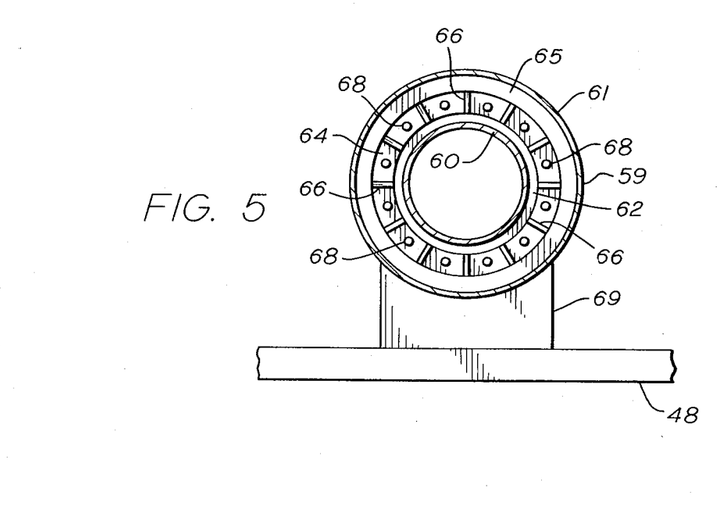
FIG. 5 is a cross sectional view of an intermediate anchor of the embodiment of FIG. 3.
Figure 7:
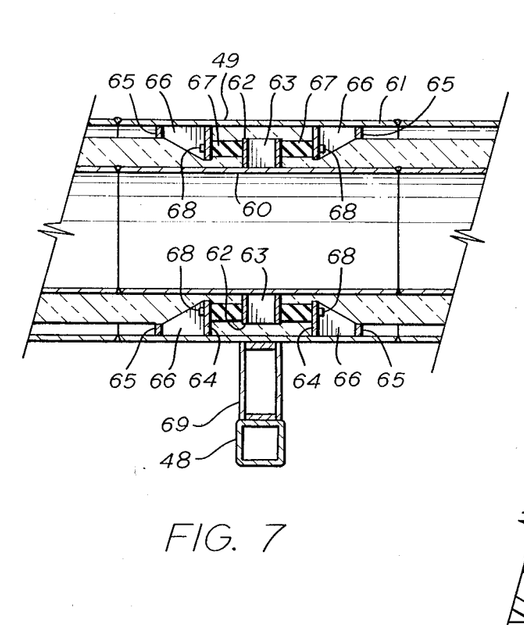
FIG. 7 is a longitudinal cross sectional side view of the intermediate anchor of FIG. 5.

The intermediate pipe anchors 59 are illustrated in FIGS. 5 and 7. The intermediate pipe anchors consist of an inner spool 60 attached to a housing 61, as follows. Two spaced-apart thrust rings 62 are fixed to the outside of the pipe spool at about the midpoint of the spool. Ribs 63 are welded between the two rings 62 perpendicular to the longitudinal axis of the pipeline for reinforcement. Four annular thrust rings are attached to the inside of the housing 61. Two of the thrust rings 64, are located adjacent to and on either side of the two thrust rings 62 attached to the inner spool. Two backup rings 65 are spaced further away from the rings 62 on the inner spool. A number of reinforcing plates 66 are attached between the two sets of thrust rings on the housing 61. Forces are transmitted from the inner spool to the housing through two insulating rings 67 located between the thrust rings on the spool and thrust rings on the housing. The insulating rings are held in position by a plurality of nuts and bolts 68. The insulating rings are also preferably made out of a material that is strong in compression and has a low coefficient of thermal conductivity such as a resin-impregnated wood. The inside of the intermediate anchor is naturally also filled with insulating material to reduce heat loss.

The intermediate anchors are supported on the frame lateral crossmembers 48 by a saddle block 69. The housing is fixed to the saddle block, which is fixed to the lateral crossmember on the frame.

Because of the relatively complicated design of the main and intermediate anchors, it is preferable that they be shop fabricated and delivered as units ready for attachment to the inner pipe and outer jacket of the pipeline.

After the underwater cryogenic pipeline system is constructed and installed, the annular space between the outer jacket and the inner pipe may be filled with a gas under pressure. The filler gas is pressurized to a pressure greater than the static pressure of sea water at the design depth. For example, for a design depth of 27 meters (90 feet), a suitable pressure would be 0.26 MPa (40 psi). Maintaining the pressure in the annulus at this level will prevent entry of sea water in the event of any leaks in the system. Moisture must be kept out of the interior of the pipeline since ice formation under the insulation can lead to insulation failure and ice formation in the bellows could damage the expansion joint. Absorption of the filler gas into the thermal insulation will increase the thermal conductivity of the insulation. Therefore, the filler gas to be used should be selected to minimize the increase.

It is known to use a denser insulation material in a submarine pipeline system than would be used for surface pipeline application, because a greater external compressive load can be supported. However, increasing the density of the insulation material results in an increase in thermal conductivity. So, while a large compressive load can be supported, the insulation will not be as effective.

Pressurized gas may be used to provide structural support to a pipeline system so tha the system can withstand elevated external compressional loads, especially those present in submarine environments. The annulus between the jacket and the insulation may be filled with gas at a pressure greater than the external pressure expected to be exerted on the outer pipe jacket. The gas is selected from those available which will not condense at extremely low temperatures which also have sufficiently low thermal conductivity.

The gas may be entirely one type of gas or a combination of gases. Preferably, the annulus will be evacuated, followed by introduction of gas into the annulus at the desired pressure. For this technique of filling the annulus to succeed, the outer jacket must be able to structurally withstand external pressure while the annulus is evacuated. If this is not possible, or is deemed to be too high a risk, the annulus must be purged of undesired gas by having both ends of the pipeline open. Gas is introduced into a first end to displace undesired gas, which exits the system through the second end. When all undesired gas has been displaced from the annulus (so that the annulus contains substantially only the selected filler gas), the second end is sealed and the pressure of the filler gas increased to the desired level.

The insulation must be capable of withstanding the increased pressure from the gas surrounding it. The insulation material is accordingly selected so that it has sufficient compressive strength to prevent collapse when subjected to the pressure exerted by the gas. Most suitable insulation materials will have a high density, since compressive strength increases proportionally with density increases. Open cell insulation material may be preferred in some applications. An open cell insulation material equalizes pressure distribution through the annulus faster, lessening the risk of insulation collapse. Open cell insulation is designed so that gas can flow through the insulation's cells and the pressure throughout the annulus and insulation material is equalized. No discrete annulus will be formed. In contrast, closed cell insulation is slower to equalize the pressure of the surrounding gases.

When closed cell insulation is used, it should be encapsulated by a vapor barrier to prevent the ingress or egress of gas or water. A vapor barrier will help to maintain the thermal conductivity of the insulation material at a generally constant level.

Figure 9:
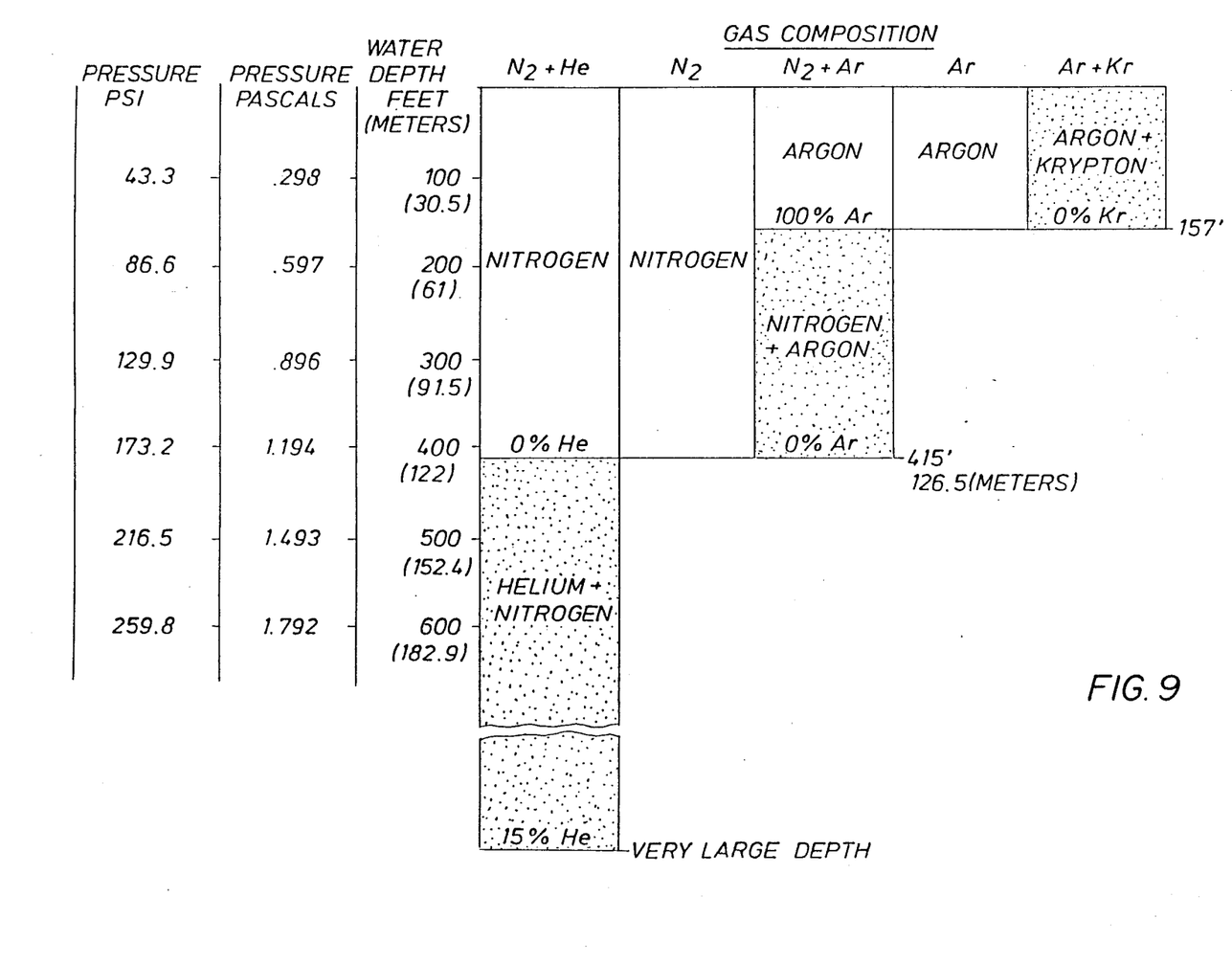
FIG. 9 is a chart showing the pressure and water depth at which selected gases and combinations of gases condense.
Figure 10:
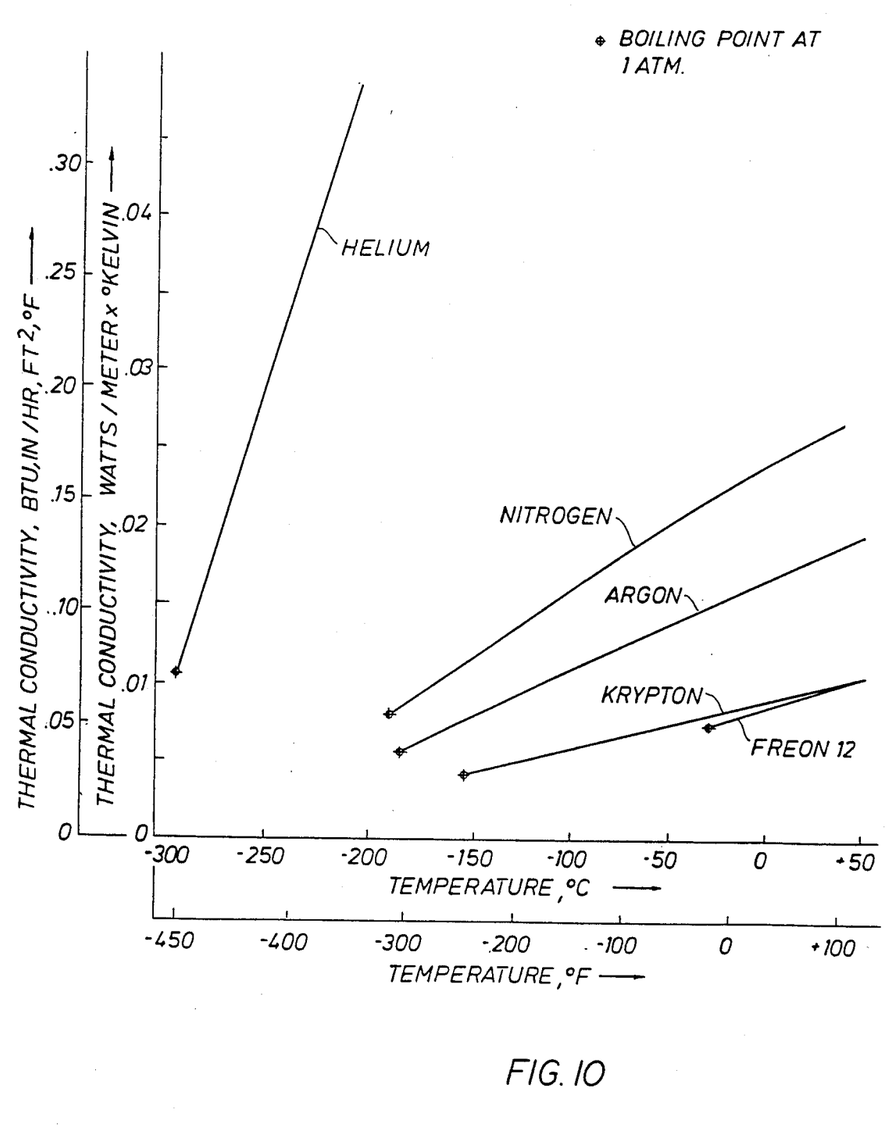
FIG. 10 is a graph showing the thermal conductivity of the gases in FIG. 9 at various temperatures.

The gas should be carefully selected to optimize utility for each particular application. For LNG applications, the gas must not condense at the low temperatures at which LNG is transported, yet it should add only minimally to the thermal conductivity of the pipeline system. FIG. 9 and FIG. 10 may be used to show how gas 16 can be selected for a particular application. FIG. 9 is a chart showing pressure in pounds per square inch and Pascals at which selected gases will condense at $-165°$ C., which is the temperature at which LNG is typically carried. The chart also shows the water depth in meters at which these pressures are found. FIG. 10 shows the thermal conductivities of the gases shown in FIG. 9 over a range of temperatures. Preferably, the gas or combination of gases selected for a given measure has the maximum molecular weight which is not subject to condensation at that pressure. Condensation should be prevented in order to maintain a constant gas pressure. In addition, condensation in open cell insulation increases the thermal conductivity of the material. If the thermal conductivity increases, a substance such as LNG will absorb heat from the surrounding insulation, causing further condensation and weakening of the insulation. The outer pipe jacket may contract and weaken as the cold LNG temperature is carried through the insulation material.

The molecular weight of the gas should be maximized since thermal conductivity generally decreases with an increase in molecular weight. The correlation between thermal conductivity and molecular weight is detailed by H. J. Huldy, "De involved van gasen waterdampdoorlatendheid van isolatiematerialen op hun warmte-isolerende eigenschappen" *Plastica*, Vol. 21, No. 9, (1968), pp. 368-376. For the reasons discussed above, it is important to minimize thermal conductivity.

By using FIGS. 9 and 10, it can be shown how a gas can be selected for use in a pipeline to be installed at a certain depth. At 300 feet (91.4 meters), the external pressure on a pipeline will be 129.9 pounds per square inch (0.896 Pa). Thus, gas in the annulus must be pressurized to a value greater than 129.9 psi (0.896 Pa). By looking at FIG. 10, it can be seen that of the gases shown, nitrogen, a helium and nitrogen mixture, and a nitrogen and argon mixture can be used. A nitrogen and argon mixture will have the lowest thermal conductivity, and is thus preferred. This mixture should have as much argon as can be used without condensation.

It is not intended that the choice of gases used is limited to those shown in FIGS. 9 and 10. The gas selected should be chemically inert with respect to the pipeline, jacket, and insulation materials.

Preferably the pipeline system is constructed by connecting a plurality of similar modules. The modules, indicated by M1 and M2 on FIGS. 2 and 3, each comprise a frame section and a section of the cryogenic pipeline. Naturally, the modules could be any selected length or configuration. The preferred configuration is described below. The preferred module length will to some degree be a function of the capability of the expansion joints to compensate for contraction, as discussed in this application above. For a system similar to the one illustrated in FIG. 3, the module length would preferably be 36.5 meters (120 feet). The M1 modules have an intermediate anchor at about the middle of the pipeline section. The M2 modules have a main anchor and an expansion joint on each side of the main anchor. The modules are adapted to be connected to adjacent modules to form a continuous pipeline system. Preferably, the ends of the modules are located at less complicated parts of the pipeline system. Thus, as shown in FIG. 3, the ends of the modules are not adjacent the anchors or expansion joints, where connection of the modules would be complicated.

Figure 8:
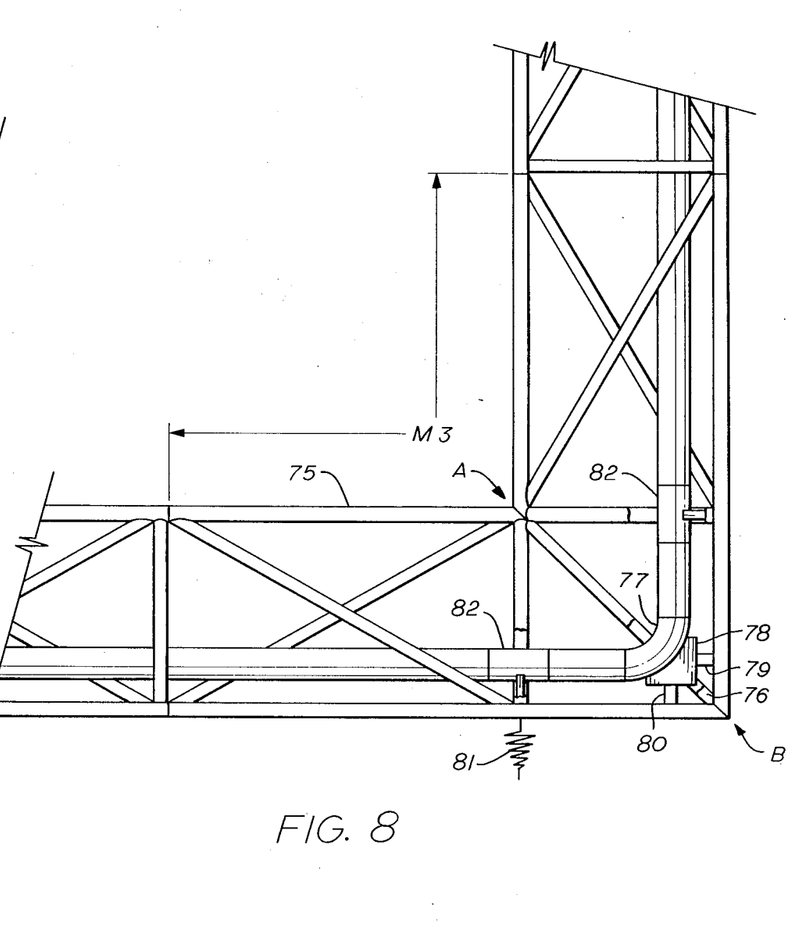
FIG. 8 is a side view of a corner module for the invention.

A side view of a typical corner module for the pipeline system is shown in FIG. 8. For a triangular frame system, the corner module frame 75 would consist of two generally triangular sections, for example, a riser would have one horizontal and one generally vertical section as shown in FIG. 8, intersecting at two points A, B and including additional braces 76 at the intersection. The pipeline is preferably anchored to the corner module frame 75 at at least two points adjacent to the bend in the pipeline by main anchors 45. Since the hydraulic forces in the pipeline are concentrated at the bend 77 in the pipeline in the corner module, the main anchors used here will likely need to be stronger to withstand the hydraulic loadings. In addition if needed, a saddle 78 may be attached to the frame by beams 79, 80 to transfer forces in the pipeline to the frame. The corner module should preferably be anchored to the soil or sea bed by any of the well known means, such as by the ground anchor 81 shown schematically in FIG. 8. If the corner module is adjacent a platform, the module can be anchored to the platform. The corner module should be connected to the M2 type modules that have expansion joints so that expansion and contraction in the pipeline system at the corner is compensated. In addition, depending upon the design of the system, it may be necessary to add some type of expansion joint (not shown) between the main anchors to compensate for contraction in the corner of the pipeline. Naturally, if the inner pipe is INVAR steel, no expansion joints are needed.

Preferably, a pipeline system would be prefabricated and delivered to the site in modular form. A complete cryogenic pipeline system may thus be assembled in the field by connecting the modules and the cryogenic pipeline sections.

In a second embodiment, the invention would utilize a high nickel steel, such as INVAR for the inner pipe. This embodiment would be identical to the embodiment described above, except that no expansion joints would be used on the inner pipe, for the reasons discussed above.

Specific embodiments of the invention have been described above. Naturally, certain modifications of the above specific embodiments may be suggested to those skilled in the art and is intended that this application cover all such modifications that fall within the scope of the attached claims.

I claim:

1. An underwater cryogenic pipeline system comprising:
    at least one pipeline for cryogenic fluid including a high nickel content steel inner pipe for carrying the cryogenic fluid, an outer jacket around the inner pipe defining an annular space therebetween and insulation in the annular space;
    an elongate open frame adapted to be laid underwater for supporting the pipeline and resisting forces on the pipeline;
    a plurality of pipe anchors attached to the pipeline and to the frame at a plurality of locations to transfer axial forces in the inner pipe to the frame; and
    at least one ground anchor attached to the frame for transmitting axial forces in the frame to the soil or sea bed.

2. The underwater cryogenic pipeline system of claim 1 wherein the pipe anchors comprise a plurality of main anchors connected to the inner pipe and the frame and a plurality of intermediate anchors between the main anchors for attaching the inner pipe to the outer jacket of the pipeline.

3. The underwater cryogenic pipeline system of claim 2 wherein the frame comprises a plurality of elongate frame members and a plurality of braces connected to the frame members to form an open space frame with a longitudinal opening therein and wherein the at least one pipeline is located in the longitudinal opening.

4. An underwater cryogenic pipeline system comprising:
    at least one pipeline for carrying cryogenic fluid in underwater service, the pipeline including an inner pipe, an outer jacket around the inner pipe and defining an annular space between the jacket and the pipe, insulation in the annular space and a plurality of expansion joints connected to the inner pipe for accommodating contraction and expansion of the inner pipe resulting from changes in the temperature of the inner pipe;
    an elongate open frame having a longitudinal opening therein adapted to be laid underwater for supporting the pipeline and resisting axial forces in the pipeline;
    a plurality of pipe anchors attached to the pipeline and to the frame in the longitudinal opening in the frame at a plurality of spaced-apart locations, wherein at least one expansion joint is located between every two successive pipe anchors; and
    at least one ground anchor for attaching the frame to the sea bed.

5. The underwater cryogenic pipeline system of claim 4, wherein the pipe anchors comprise main anchors attached to the inner pipe and to the frame and intermediate anchors attached to the inner pipe and the outer jacket at a plurality of spaced apart locations between successive main anchors.

6. The underwater cryogenic pipeline system of claim 5 wherein the expansion joints comprise bellows.

7. The underwater cryogenic pipeline system of claim 5 wherein the expansion joints comprise pipe loops.

8. The underwater cryogenic pipeline system of claim 5 wherein the frame comprises at least three elongate frame members interconnected by braces to define an open space frame with a central longitudinal opening and further includes a plurality of lateral crossmembers attached to the frame and to the main and intermediate anchors at a plurality of locations adjacent the longitudinal opening in the frame.

9. The underwater cryogenic pipeline system of claim 8 wherein:
    pairs of expansion joints are provided at successive intervals on the inner pipe of the pipeline; and
    the main anchors are connected to the inner pipe and to the lateral crossmembers at locations on the inner pipe between the two expansion joints in each pair.

10. The underwater cryogenic pipeline system of claim 9 wherein the intermediate anchors are located about midway between successive main anchors.

11. An underwater cryogenic pipeline system comprising:
    at least one pipeline for carrying cryogenic fluid in underwater service, the pipeline including an inner pipe, an outer jacket around the inner pipe and defining an annular space therebetween, insulation in the annular space, and a plurality of expansion joints connected to the inner pipe for compensating for contraction of the inner pipe as a result of changes in the temperature of the inner pipe;
    at least one vapor return pipeline adapted for carrying cryogenic vapors in underwater service, comprising an inner pipe, an outer jacket around the inner pipe defining an annular space therebetween, insulation in the annular space, and a plurality of expansion joints connected to the inner pipe for compensating for contraction of the inner pipe as a result of changes in the temperature of the inner pipe;
    an elongate open frame adapted to be submerged for supporting the pipelines at the sea bed, comprising at least three elongate frame members configured as an open space frame with a central longitudinal opening, and further including a plurality of lateral crossmembers connected to the frame adjacent the central longitudinal opening;
    a plurality of main anchors attached to the inner pipes and to the lateral crossmembers at locations on the inner pipes between successive expansion joints, so at least one expansion joint is located between each two successive main anchors; and
    means for anchoring the frame to the sea bed.

12. The underwater cryogenic pipeline system of claim 11 further including a plurality of intermediate anchors connected to the inner pipes and to the outer jackets and located between successive main anchors on the inner pipes.

13. The underwater cryogenic pipeline system of claim 12 wherein:
the expansion joints comprise adjacent pairs of expansion joints connected to the inner pipes; and
a main anchor is located between the two expansion joints in each pair.

14. The underwater cryogenic pipeline system of claim 13 wherein the frame is generally triangular in cross section.

15. An underwater cryogenic pipeline system comprising:
a plurality of interconnected modules, each of the modules comprising:
an elongate open frame section;
a cryogenic pipeline section comprising an inner pipe, an outer jacket around the inner pipe defining an annular space therebetween, and insulation in the annular space;
at least one pipe anchor connected to the inner pipe and to the frame section in the longitudinal opening;
wherein the frame sections and cryogenic pipeline sections are adapted to be connected to similar frame sections and pipeline sections, respectively to define a continuous cryogenic pipeline mounted in a continuous frame; and
means for anchoring at least one of the modules to the sea bed.

16. The underwater cryogenic pipeline system of claim 15 further including a plurality of pipe anchors connected to the inner pipe and the outer jacket.

17. The underwater cryogenic pipeline system of claim 16 wherein the inner pipe is high nickel content steel.

18. The underwater cryogenic pipeline system of claim 16 including a plurality of expansion joints connected to the inner pipe, wherein the continuous pipeline defined by the modules has at least one expansion joint between successive pipe anchors.

19. The underwater cryogenic pipeline system of claim 18 wherein:
the pipe anchors comprise main anchors connected to the inner pipe and the frame and intermediate anchors connected to the inner pipe and the outer jacket; and
the modules comprise first modules including two expansion joints and a main anchor between the expansion joints and second modules including an intermediate anchor, wherein the first and second modules are adapted to be connected to form a continuous cryogenic pipeline in a continuous frame.

20. The underwater cryogenic pipeline system of claim 19 wherein the frame section comprises:
at least three elongate frame members;
a plurality of braces connected to the elongate frame members to form an elongate open space frame section;
at least one lateral crossmember connected to the frame section and adapted to be connected to the inner pipe of the pipeline section to locate the pipeline section in the longitudinal opening.

21. The underwater cryogenic pipeline system of claim 20 wherein the frame section comprises three frame members and is triangular in cross section.

22. A module for an underwater cryogenic pipeline system comprising:
an elongate open frame section having a longitudinal opening and ends adapted to be connected to the ends of similar frame sections; and
a cryogenic pipeline section, comprising an inner pipe adapted to be connected to similar inner pipes, an outer jacket around the inner pipe and defining an annular space and insulation in the annular space, and including at least one pipe anchor connected to the pipeline section and to the frame section in the longitudinal opening, wherein the module is adapted to be connected to other modules to define a continuous cryogenic pipeline.

23. The module of claim 22 wherein the inner pipe is high nickel content steel.

24. The module of claim 22 wherein the anchor is a main anchor connected to the inner pipe and to the frame and including an expansion joint connected to the inner pipe.

25. The module of claim 24 including at least two expansion joints wherein a main anchor is between the expansion joints.

26. The module of claim 25 wherein the frame section comprises:
a plurality of elongate frame members;
a plurality of braces connected to the frame members to form an elongate open space frame; and
at least one lateral crossmember connected to the frame for connection to the main anchor to locate the pipeline section in the longitudinal opening of the frame section.

27. The module for an underwater cryogenic pipeline system of claim 26 wherein the frame section comprises three frame members and is triangular in cross section.

28. The module for an underwater cryogenic pipeline system of claim 27 wherein the expansion joint comprises bellows.

29. The module for an underwater cryogenic pipeline system of claim 27 wherein the expansion joint comprises a pipe loop.

30. The module of claim 22 wherein the anchor is an intermediate anchor connected to the inner pipe and the outer jacket.

31. The module of claim 30 wherein the frame section comprises:
a plurality of elongate frame members;
a plurality of braces connected to the frame members to form an elongate open space frame; and
at least one lateral crossmember connected to the frame adjacent to the intermediate anchor for supporting the pipeline section in the longitudinal opening of the frame section.

32. The module for an underwater cryogenic pipeline system of claim 31 wherein the frame section comprises three frame members and is triangular in cross section.

* * * * *